(12) United States Patent
 Sudarsky

(10) Patent No.: US 12,608,882 B2
(45) Date of Patent: Apr. 21, 2026

(54) DETERMINATION OF ILLUMINATION PARAMETERS IN MEDICAL IMAGE RENDERING

(71) Applicant: Siemens Healthineers AG, Forchheim (DE)

(72) Inventor: Sandra Sudarsky, Bedminster, NJ (US)

(73) Assignee: Siemens Healthineers AG, Forchheim (DE)

( * ) Notice: Subject to any disclaimer, the term of this patent is extended or adjusted under 35 U.S.C. 154(b) by 323 days.

(21) Appl. No.: 18/187,705

(22) Filed: Mar. 22, 2023

(65) Prior Publication Data
US 2023/0316638 A1     Oct. 5, 2023

(30) Foreign Application Priority Data
Apr. 1, 2022    (EP) ..................................... 22166257

(51) Int. Cl.
 *G06T 15/50*        (2011.01)
 *G06T 15/08*        (2011.01)
(52) U.S. Cl.
 CPC ............ *G06T 15/506* (2013.01); *G06T 15/08* (2013.01); *G06T 2210/41* (2013.01)
(58) Field of Classification Search
 CPC .... G06T 15/506; G06T 15/08; G06T 2210/41
 See application file for complete search history.

(56) References Cited

U.S. PATENT DOCUMENTS

| | | | | | |
|---|---|---|---|---|---|
| 5,392,046 | A | * | 2/1995 | Hughes | .................... G01V 3/12 |
| | | | | | 342/197 |
| 8,970,581 | B2 | * | 3/2015 | Shi | .......................... G06T 7/187 |
| | | | | | 345/419 |
| 9,342,920 | B1 | * | 5/2016 | McKenzie | .............. G06T 15/08 |
| 9,760,690 | B1 | * | 9/2017 | Petkov | ................... G16H 30/40 |
| 9,984,493 | B2 | * | 5/2018 | Zhou | ......................... G06T 5/70 |

(Continued)

FOREIGN PATENT DOCUMENTS

| | | | |
|---|---|---|---|
| EP | | 3296962 A2 | 3/2018 |
| WO | 2017153445 A1 | | 9/2017 |

OTHER PUBLICATIONS

K. J. Lal, D. Rana and A. S. Parihar, "A Comparative Study on CNN based Low-light Image Enhancement," 2021 11th International Conference on Cloud Computing, Data Science & Engineering (Confluence), Noida, India, 2021, pp. 459-464, doi: 10.1109/Confluence51648.2021.9377195. (Year: 2021).*

(Continued)

*Primary Examiner* — Charles L Beard

(57) ABSTRACT
A convolution neural network, CNN, is trained to determine illumination parameters for image rendering of medical data. For training, a set of images are rendered using a set of rendering configurations, selected from the group of: a set of different camera parameters, a set of different transfer functions for assigning optical properties, like for example color and opacity, to original values of the raw data to be rendered, and a set of different illumination parameters. An evaluation score is computed for representing an amount of image information for each of the rendered images. The computed evaluation score for each rendered image and the rendering configurations applied for rendering the image are used to train the CNN.

18 Claims, 2 Drawing Sheets

(56) References Cited

U.S. PATENT DOCUMENTS

| | | | | |
|---|---|---|---|---|
| 10,311,631 | B2 * | 6/2019 | Petkov | G06T 15/06 |
| 10,420,486 | B1 * | 9/2019 | McNair | A61B 5/7455 |
| 10,672,153 | B2 * | 6/2020 | Adler | G06T 12/20 |
| 10,902,670 | B1 * | 1/2021 | Schied | G06N 3/045 |
| 10,905,400 | B2 * | 2/2021 | Day | A61B 8/0866 |
| 11,295,514 | B2 * | 4/2022 | Gu | G06N 3/084 |
| 11,302,069 | B2 * | 4/2022 | Engel | G06T 15/08 |
| 11,488,293 | B1 * | 11/2022 | Guo | G06T 5/50 |
| 11,507,836 | B1 * | 11/2022 | Kurz | G06V 10/82 |
| 12,211,225 | B2 * | 1/2025 | Bi | G06T 15/20 |
| 12,243,273 | B2 * | 3/2025 | Lv | G06T 15/205 |
| 2008/0194946 | A1 * | 8/2008 | Summers | A61B 5/4255 600/425 |
| 2009/0052767 | A1 * | 2/2009 | Bhalerao | G06T 17/20 382/154 |
| 2012/0053408 | A1 * | 3/2012 | Miyamoto | G06T 7/74 600/109 |
| 2012/0212642 | A1 * | 8/2012 | Kehtarnavaz | H04N 23/70 348/222.1 |
| 2013/0039574 | A1 * | 2/2013 | McKay | G06V 20/13 382/167 |
| 2013/0121548 | A1 * | 5/2013 | Kovalan | G06T 15/08 382/128 |
| 2013/0169639 | A1 * | 7/2013 | Shi | G06T 7/11 345/424 |
| 2014/0177911 | A1 * | 6/2014 | Heisele | G06V 40/103 382/103 |
| 2016/0343161 | A1 * | 11/2016 | Paladini | G06T 15/506 |
| 2017/0249749 | A1 * | 8/2017 | Takahashi | A61B 5/743 |
| 2017/0308656 | A1 * | 10/2017 | Petkov | G16H 30/40 |
| 2018/0047208 | A1 * | 2/2018 | Marin | G06T 15/506 |
| 2018/0082487 | A1 * | 3/2018 | Kiraly | G06T 19/20 |
| 2018/0199902 | A1 * | 7/2018 | Erhard | A61B 6/463 |
| 2018/0260997 | A1 * | 9/2018 | Petkov | G06T 15/08 |
| 2019/0050999 | A1 * | 2/2019 | Piat | G06T 19/20 |
| 2019/0147645 | A1 * | 5/2019 | Mory | G06T 15/50 600/443 |
| 2019/0164261 | A1 * | 5/2019 | Sunkavalli | G06T 1/20 |
| 2019/0183451 | A1 * | 6/2019 | Yu | G06F 16/50 |
| 2019/0216409 | A1 * | 7/2019 | Zhou | A61B 6/032 |
| 2019/0325573 | A1 * | 10/2019 | Bernard | A61B 6/025 |
| 2019/0325620 | A1 * | 10/2019 | Adler | G06T 12/20 |
| 2019/0333198 | A1 * | 10/2019 | Wang | G06T 5/50 |
| 2019/0340810 | A1 * | 11/2019 | Sunkavalli | G06T 7/70 |
| 2019/0355150 | A1 * | 11/2019 | Tremblay | G06N 3/08 |
| 2020/0051260 | A1 * | 2/2020 | Shen | G06N 3/04 |
| 2020/0151509 | A1 * | 5/2020 | Sunkavalli | G06V 10/82 |
| 2020/0184708 | A1 * | 6/2020 | Petkov | G06T 15/08 |
| 2020/0410727 | A1 * | 12/2020 | Yamakawa | G01N 23/044 |
| 2021/0073955 | A1 * | 3/2021 | Zhang | G06T 5/92 |
| 2021/0150706 | A1 * | 5/2021 | Chen | G06T 7/0012 |
| 2021/0186659 | A1 * | 6/2021 | Li | G06N 3/084 |
| 2021/0287430 | A1 * | 9/2021 | Li | G06T 7/74 |
| 2021/0349324 | A1 * | 11/2021 | Vuong | G02B 3/0006 |
| 2021/0350513 | A1 * | 11/2021 | Takahashi | G06N 3/08 |
| 2022/0108131 | A1 * | 4/2022 | Kuen | G06N 3/045 |
| 2022/0180173 | A1 * | 6/2022 | Jonnalagadda | A63F 13/67 |
| 2022/0207656 | A1 * | 6/2022 | Yao | G06N 3/08 |
| 2022/0215646 | A1 * | 7/2022 | Park | G06N 3/08 |
| 2022/0237336 | A1 * | 7/2022 | Zhao | G06F 30/27 |
| 2022/0284551 | A1 * | 9/2022 | Neofytou | G06T 5/77 |
| 2022/0309744 | A1 * | 9/2022 | Bigos | G06N 3/09 |
| 2022/0335636 | A1 * | 10/2022 | Bi | G06T 15/06 |
| 2022/0405521 | A1 * | 12/2022 | Joze | G06T 7/90 |
| 2022/0414928 | A1 * | 12/2022 | Venkataraman | G06V 10/82 |
| 2023/0014245 | A1 * | 1/2023 | Munkberg | G06T 5/60 |
| 2023/0037591 | A1 * | 2/2023 | Villegas | G06T 7/70 |
| 2023/0140460 | A1 * | 5/2023 | Munkberg | G06N 3/045 345/423 |
| 2023/0162364 | A1 * | 5/2023 | Leifman | G06T 7/10 382/128 |
| 2023/0177771 | A1 * | 6/2023 | Assarsson | G06T 17/00 345/420 |
| 2023/0206588 | A1 * | 6/2023 | Colabrese | G06T 1/20 382/190 |
| 2023/0214708 | A1 * | 7/2023 | Hudon | G06N 20/00 706/12 |
| 2023/0245382 | A1 * | 8/2023 | Gardner | G06T 19/006 345/426 |
| 2023/0281789 | A1 * | 9/2023 | Sudarsky | G06F 18/214 382/128 |
| 2023/0281955 | A1 * | 9/2023 | Ackerson | G06V 10/60 382/274 |
| 2023/0334764 | A1 * | 10/2023 | Lee | G06T 15/10 |
| 2023/0342894 | A1 * | 10/2023 | Scharfenberger | H04N 5/2624 |
| 2023/0360214 | A1 * | 11/2023 | Petkov | G06T 7/0014 |
| 2023/0360312 | A1 * | 11/2023 | Liu | G06T 12/30 |
| 2023/0368459 | A1 * | 11/2023 | Garon | G06T 15/60 |
| 2023/0386107 | A1 * | 11/2023 | Aluru | G06N 3/04 |
| 2024/0048848 | A1 * | 2/2024 | Chik | G01N 21/9515 |
| 2024/0070972 | A1 * | 2/2024 | Kosiorek | G06N 3/0464 |
| 2024/0087218 | A1 * | 3/2024 | Petkov | G06T 15/08 |
| 2024/0095880 | A1 * | 3/2024 | Liu | G06N 3/047 |
| 2024/0096017 | A1 * | 3/2024 | Gao | G06T 15/04 |
| 2024/0108299 | A1 * | 4/2024 | Ikuta | A61B 6/5258 |
| 2024/0115325 | A1 * | 4/2024 | Calloway | G06N 3/045 |
| 2024/0144584 | A1 * | 5/2024 | Son | G06N 3/045 |
| 2024/0153196 | A1 * | 5/2024 | Blukis | G06T 7/90 |
| 2024/0154941 | A1 * | 5/2024 | Nagpal | G06F 21/6254 |
| 2024/0169652 | A1 * | 5/2024 | Fu | G06T 7/40 |
| 2024/0233228 | A1 * | 7/2024 | Petkov | G06T 13/20 |
| 2024/0257448 | A1 * | 8/2024 | Shah | G06T 15/06 |
| 2024/0303899 | A1 * | 9/2024 | Iyer | G06T 15/005 |
| 2024/0305893 | A1 * | 9/2024 | Naruse | G03B 7/17 |
| 2024/0320912 | A1 * | 9/2024 | Li | G06T 15/20 |
| 2024/0362793 | A1 * | 10/2024 | Raj | G06T 15/06 |
| 2024/0362848 | A1 * | 10/2024 | Yoo | G06T 15/00 |
| 2024/0386651 | A1 * | 11/2024 | Liu | G06T 17/005 |
| 2024/0386656 | A1 * | 11/2024 | Pun | G06N 20/00 |
| 2024/0412444 | A1 * | 12/2024 | Philip | G06T 7/70 |
| 2025/0078213 | A1 * | 3/2025 | O'Neil | G06T 5/70 |
| 2025/0086833 | A1 * | 3/2025 | Liu | G06V 10/513 |
| 2025/0104323 | A1 * | 3/2025 | Nonn | G06T 15/08 |
| 2025/0111513 | A1 * | 4/2025 | Tegzes | G06T 7/0014 |
| 2025/0111597 | A1 * | 4/2025 | Kim | G06T 1/60 |
| 2025/0120568 | A1 * | 4/2025 | Watanabe | A61B 1/000096 |
| 2025/0209670 | A1 * | 6/2025 | Chau | G06T 5/90 |
| 2025/0209712 | A1 * | 6/2025 | Svitov | G06N 3/047 |
| 2025/0232520 | A1 * | 7/2025 | Nakamura | G06T 15/506 |
| 2025/0294259 | A1 * | 9/2025 | Shi | H04N 23/71 |
| 2025/0378632 | A1 * | 12/2025 | Khamis | G06T 15/506 |
| 2026/0004566 | A1 * | 1/2026 | Schräbler | G06V 10/7747 |

OTHER PUBLICATIONS

Comaniciu D, Engel K, Georgescu B, Mansi T. "Shaping the future through innovations: from medical imaging to precision medicine." Med Image Anal.; 2016; 33(C):19-26.

Faisal Mahmood, "Deep Learning with 1-16 Cinematic Rendering: Fine-Tuning Deep Neural Networks Using Photorealistic Medical Images", arxiv.org, Cornell University Library, 201 Olin Library Cornell University Ithaca, NY 14853, Sep. 29, 2018.

Gumhold S Ed—Moorhead R et al: "Maximum entropy light source placement", VIS 2002. IEEE Visualization 2002. Proceedings. Boston, Ma, Oct. 27-Nov. 1, 2002; Annual IEEE Conference on Visualization], New York, NY: IEEE, US, Jan. 2002 (Jan. 2002), pp. 275-282.

Kan, P., Kafumann, H. DeepLight: light source estimation for augmented reality using deep learning. Vis Comput 35, 873-883 (2019).

Mittal A et al: "No-Reference Image 4 Quality Assessment in the Spatial Domain", IEEE Transactions on Image Processing; IEEE, USA, vol. 21, No. 12, Dec. 2012 (Dec. 2012), pp. 4695-4708.

P Vázquez. "Automatic light source placement for maximum visual information recovery" Computer Graphics Forum 26(2), 2007, 143-156.

Shacked, Ram & Lischinski, Dani. (2001). Automatic Lighting Design Using a Perceptual Quality Metric. Comput. Graph. Forum. 20. 10.1111/1467-8659.00514.

(56)　　　　　　　References Cited

OTHER PUBLICATIONS

Sparavigna, Amelia Carolina. "Entropy in Image Analysis." Entropy (Basel, Switzerland) vol. 21,5 502. May 17, 2019, a href="doi:10.3390/e21050502" target="_blank" doi:10.3390/e21050502/a.

European Search Report mailed Nov. 18, 2022 in corresponding European Patent Application No. 22166257.0.

* cited by examiner

DETERMINATION OF ILLUMINATION PARAMETERS IN MEDICAL IMAGE RENDERING

RELATED APPLICATION

This application claims the benefit of EP 22166257.0, filed Apr. 1, 2022, which is hereby incorporated by reference in its entirety

FIELD

The present description relates to medical image processing or imaging for medical datasets and in particular to methods and systems for using deep learning for determining light or illumination parameters, respectively, such as light source position and/or direction.

BACKGROUND

Proper illumination is essential for extracting and/or communicating information about a 3D scene. In particular, in medical imaging, the task of determining the correct illumination parameters is crucial for a medical diagnosis. For example, in a CT liver scan, an inappropriate illumination parameter can lead to a situation where cancerous structures may not be differentiated well enough from healthy surrounding anatomical structures. This situation may lead to wrong diagnoses or, in case of image-supported surgical interventions, the surgical procedure may be impaired. Another example relates to treatment planning of vascular pathology, where more often 3D visualization is being used for surgical planning and interventions than for diagnostics.

Several global illumination-based algorithms, including a cinematic renderer, have been designed to generate photo-realistic renderings of volumetric medical datasets or any volumetric data. These algorithms simulate the physical propagation of light through the volumetric data. Even less complicated algorithms that simplify the rendering process to achieve interactive speeds often add some type of inter-active volumetric shadow model to generate good quality volume renderings. The shadowing effects as well as the ambient occlusions generated by these algorithms add important visual cues that enhance the depth as well as the shape perception of the 3D objects, like organs or anatomical structures (healthy or lesions). However, the light placement also plays an important role for the image quality and the amount of details present in the rendered images.

Despite important advances in the area of light design, finding the best parameters to illuminate a scene remains a manual and time-consuming task. Some of the difficulties arise from the large parameter space of possible light positions and intensities. In addition, metrics to evaluate the light placement must take into account that images without shadows often appear flat but shadows themselves can hide critical details of the scene.

It is therefore essential to render scenes with proper lighting, especially in medical visualization applications where understanding shapes and sizes of structures and/or the relative location of separate structures (i.e., how close e.g., an artery is to a lesion) is paramount.

SUMMARY AND DESCRIPTION

This disclosure presents a deep learning approach to find an optimal light configuration for volume rendering, one that maximizes the information present in the rendered image.

Based on the above, the present disclosure has the object to provide methods, systems and tools for automatically determining correct and/or appropriate illumination parameters for image rendering.

This object is solved by the subject matters according to a method for training a convolution neural network, CNN, for determining illumination parameters for image rendering of medical data, a method for using such trained CNN, a training tool, and an illumination tool as well as a computer program product.

One aspect relates to computer-implemented method for training a convolution neural network, CNN, for determining illumination parameters for image rendering of medical data, the method includes the acts of:

Receiving raw data for rendering;

Providing a set of rendering configurations, selected from the group consisting of: a set of different camera parameters, a set of different transfer functions for assigning optical properties, like for example color and opacity, to original values of the raw data to be rendered, and a set of different illumination parameters; typically, the set of rendering configurations are pre-configured or preset. Pre-configuration or presetting may be designed according to detected modality, organ and/or clinical use-case(s);

Using a renderer to render a set of images by using the set of provided rendering configurations;

Computing an evaluation score for representing an amount of image information (e.g., Shannon Entropy) for each of the rendered images;

Using the computed evaluation score for each rendered image and the rendering configurations which have been applied for rendering the image to train the CNN;

Providing a trained CNN. With other words, the trained CNN is the output of this stage.

The proposed method has several advantages. The provided trained CNN may be used for automatically and reliably determining the illumination parameters for a particular rendering task and/or process of raw data. Subsequently, the determined illumination parameters may be used for rendering. With this solution, it is possible to find the optimal light configuration for volume rendering, namely one that maximizes the information present in the rendered image. This is essentially important for medical procedures.

In the following, the terms used within this application are explained in more detail.

Illumination parameters are parameters that are relevant for light configuration applied for rendering. Illumination parameters may be represented as an electronic dataset that characterizes a light design to be used for rendering. Illumination parameters at least include an indication of light placement or light position. The light placement determines also where the shadows appear.

Illumination parameters may be selected from the group of a direction parameter, a position parameter, and an intensity parameter. In particular a direction parameter is required for a directional lightning and a position parameter is required for a point light source.

The set of rendering configurations are typically pre-defined or pre-configured. The set of rendering configurations or rendering parameters may be used in a default form. The set of rendering configurations may include the transfer function, the ambient, and/or specular materials. The rendering configuration may include camera parameters, like e.g., a camera position. In particular, the camera position can be automatically set based on volume information, for instance placed outside the volume, looking towards the center of the volume. Alternatively, or in addition, the camera position can be computed based on segmentation information. Alternatively, or in addition, the camera position can be set by the user manually. The transfer function is usually given by a presetting based on the modality and type of study (lungs, abdomen, etc.). In addition to the camera parameters, the rendering configuration may include clipping planes, crop boxes, defined to cut through the volume and reveal its insides.

The camera parameters may include a direction parameter. The direction parameter determines the orientation of the camera rays. The light direction specifies the direction of the light rays.

The light parameters may include an intensity parameter, characterizing the strength and/or intensity of light.

The camera parameters may include a camera aperture parameter, characterizing and/or controlling how wide the lens is opened. The wider the lens is opened, the shallower the depth of field, generating blurry background. However, for the purpose of rendering, generally, the light and/or light parameters is/are independent of the camera parameters.

A CNN is a model in the field of deep learning. The main advantage of a CNN is that it automatically identifies the relevant features in the input data without any human intervention. Thus, the act of feature extraction is no longer necessary within this architecture. A CNN network usually consists of an input layer, at least one (usually several) convolutional layer(s), a ReLU Layer, a pooling layer, a fully connected layer and the output layer. In each convolutional layer, several kernels (filters) are available and used, forming the basis for local connections. Some loss functions may be used to calculate the predicted error generated across the training samples in the CNN model. The error reveals the difference between the actual output of the CNN and the label. This error will be optimized by a CNN learning process.

The raw data may be or may include medical data. The raw data may include image data from different imaging modalities, like computer tomography, CT, medical resonance imaging, MRI, ultrasound imaging, US, Positron emission tomography, PET, which is a type of nuclear medicine procedure that measures metabolic activity of the cells of body tissues, and others. Medical data may be 2D or 3D or video data. Typically, medical data are volumetric data.

Direct Volume Renderings, DVR, represent a color or a greyscale image of the different structures within a volume by mapping different data values, such as greyscale values, to different colors/greyscale values and opacities. Essentially, this mapping classifies the different objects that have been captured within the data. Direct volume renderings allow for quick and efficient examination of these objects.

The mapping of data values to greyscale values/colors and opacities is modeled in a transfer function and typically represented by a set of piecewise linear functions. A piecewise linear function includes control points, each of which defines a greyscale values/color and an opacity at a particular position in the data histogram. Positions between adjacent control points are linearly interpolated. In general, the quality and usefulness of a direct volume rendering depends in large part on the transfer function and how it emphasizes structures of interest and hides uninteresting areas.

The type of rendering is not delimited to a certain technique. For example, cinematic rendering may be used. With respect to the cinematic renderer of the Applicant, for more details it is referred to Comaniciu D, Engel K, Georgescu B, Mansi T. Shaping the future through innovations: from medical imaging to precision medicine. Med Image Anal. 2016; 33(C):19-2. The rendering (or the renderer respectively) may use a path tracing algorithm. Alternatively, a conventional ray tracing algorithm may be applied.

In an advantageous embodiment, the evaluation score is a Shannon Entropy or an extended Shannon Entropy or another image entropy or a measure of image information content.

In another advantageous embodiment, the evaluation score is calculated as an amount of image contrast or as a Brisque evaluator, which measures image naturalness.

In another advantageous embodiment, training the CNN is executed by generating values for adjusting biases and weights of the CNN.

In another advantageous embodiment, training is executed by using an L2 loss on the entropy function. $\|H(I(\omega_i,l_i))-H(I(\omega_o,l_o))\|$, where $H(I(\omega_o,l_o))$ is the entropy of a ground truth image rendered with lighting direction $\omega_o$ and intensity $l_o$.

Another aspect relates to using such a trained CNN, which has been trained with a method as described above for determining illumination parameters for image rendering of medical data. The method includes the acts of:

Receiving raw data for rendering;

Applying the trained CNN for providing the illumination parameters, maximizing an amount of image information present in the rendered image;

Using the determined illumination parameters for rendering the image for the raw data.

It is to be noted, that the subject matter, in this case relates to a computer-implementation and that is why the different features and/or embodiments, mentioned in this description may also be combined. Generally, it is to be pointed out that software typically is modular in nature. Thus, a specific implemented feature mentioned in combination with a certain embodiment may also be combined with other features, even when mentioned in other embodiments. Accordingly, any feature may be combined with at least any other feature, which is claimed and/or described in this application, even when in another context.

Features, advantages or alternative embodiments mentioned with respect to the method can also be assigned, transferred or, applied to the other claimed or described subject matters (e.g., system/apparatus, in particular the training or the illumination tool, the computer program, a computer program product, or a non-transitory computer readable storage medium) and vice versa. In other words, the subject matter of the apparatus/system can be improved or further developed with features described or claimed in the context of the method and vice versa. In this case, the functional features of the method are embodied by structural units of the system, configured to dedicatedly execute this function and vice versa, respectively. Generally, in computer science, at least from a computational point of view, a software implementation and a corresponding hardware implementation are equivalent, at least from a computability perspective. Thus, for example, a method act for "storing" data may be performed with a "storage unit" (memory) and respective instructions to write data into the storage. For avoiding redundancy, these embodiments are not reiterated or explicitly described again for the apparatus, because they have been described already in relation to the method.

Wherever not already described explicitly, individual embodiments, or their individual aspects and features, described herein can be combined or exchanged with one another, even when mentioned in other embodiments, without limiting or widening the scope of the described invention, whenever such a combination or exchange is meaningful. Accordingly, any feature may be combined with at least one other feature, which is claimed and/or described in this application.

Another aspect relates to a training tool for training a convolution neural network, CNN, for determining illumination parameters for image rendering of medical data that is adapted to execute the method as described above. The tool includes:

An input interface for receiving raw data to be rendered;
A second interface configured for receiving data from a first storage for storing and/or providing a set of rendering configurations, selected from the group of: a set of different camera parameters, a set of different transfer functions for assigning optical properties, like for example color and opacity, to original values of the raw data to be rendered, and a set of different illumination parameters;
A renderer (graphics processing unit) configured to render a set of images by using the set of provided rendering configurations;
A processing unit (processor) for computing an evaluation score for representing an amount of image information for each of the rendered images and in particular in each image;
wherein the processing unit is further configured for using the computed evaluation score for each rendered image and the rendering configurations which have been applied for rendering the image to train the CNN;
An output interface to a second storage (memory) for providing a trained CNN.

In another aspect, an illumination tool is provided for determining illumination parameters for image rendering of medical data. The illumination tool is configured to execute the method as described above, with:

An input interface for receiving raw data to be rendered;
A processing unit which is configured for applying the trained CNN for determining the illumination parameters, maximizing an amount of image information present in the rendered image;
A renderer, which is configured for using the determined illumination parameters for rendering the image for the received raw data.

In another aspect, a medical imaging system is provided for rendering medical images with a renderer and an illumination tool as described above.

In another aspect, a computer program product includes computer instructions which induce a computer to execute the acts of the method according to one of the preceding method descriptions, when the computer instructions are loaded into a memory of the computer.

Optionally, the computer program product may be stored on a non-transitory computer-readable medium. The computer program product may also be provided for download, e.g., via a radio or cellular network, the Internet and/or a host computer. Alternatively, or in addition, the method may be encoded in a Field-Programmable Gate Array (FPGA) and/or an Application-Specific Integrated Circuit (ASIC), or the functionality may be provided for download by a hardware description language.

These and other aspects of the invention will be apparent from and elucidated with reference to the embodiments described hereinafter.

6

DETAILED DESCRIPTION

Figure 1:
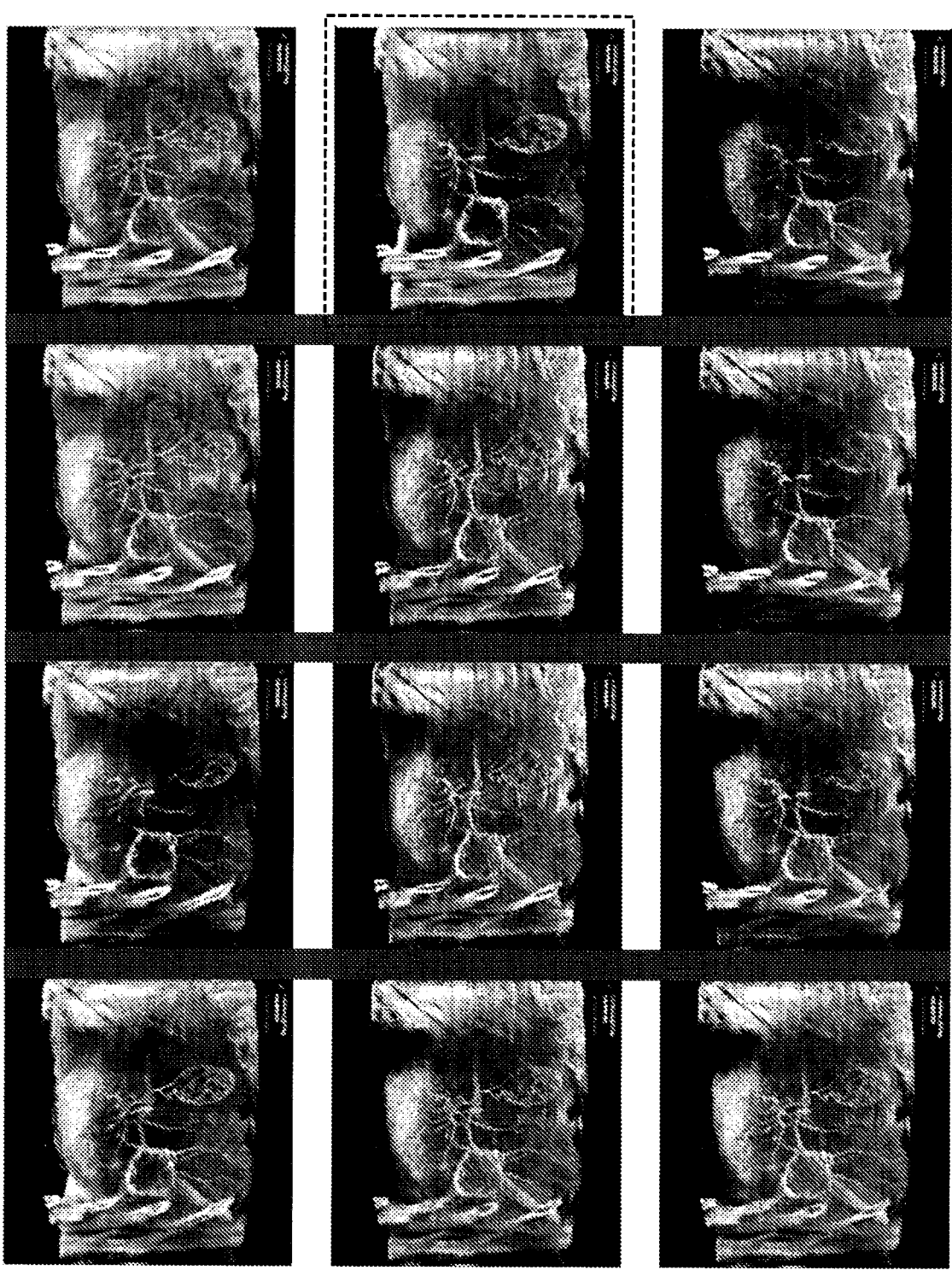
FIG. 1 shows multiple example renderings, each image generated using the same camera parameters with the light source illuminating the scene from slightly different directions.

The present description deals with the lighting design for volume rendering of medical images.

Although lighting design for volume rendering is an active area of research, techniques to automatize this process have not found their way into today's practical workflows. Although it is difficult to agree on a metric that determines an optimal configuration, some papers have defined the problem as an optimization problem.

Shacked and Lischinski (see: Shacked, Ram & Lischinski, Dani. (2001). Automatic Lighting Design Using a Perceptual Quality Metric. Comput. Graph. Forum. 20. 10.1111/1467-8659.00514) compute the lighting configurations by optimizing an objective function based on six parameters, each devoted to improving different aspects of the image such are reducing variance, increasing edge definitions, etc. Some manual calibration to identify weights for these parameters have been found necessary for rendering different scenes.

The concept of information entropy has been used in multiple image analysis applications from image compression, image registration to image segmentation (see: Sparavigna, Amelia Carolina. "Entropy in Image Analysis." Entropy (Basel, Switzerland) vol. 21,5 502. 17 May 2019, doi:10.3390/e21050502). As entropy measures the amount of information present in an image, optimization algorithms have been designed to automatically select lighting parameters that maximize the information perceived by a user for a fixed camera view direction (see: Gumhold, Stefan. (2002). Maximum entropy light source placement. Proceedings of the Visualization 2002 Conference. 275-282. 10.1109/VISUAL.2002.1183785 and P Vázquez. Automatic light source placement for maximum visual information recovery, Computer Graphics Forum 26 (2), 2007, 143-156). Gumhold presented an optimization method for automatic light source placement by maximizing the lighting entropy as an extension of the conventional Shannon entropy. He defines the lighting entropy as a function of the image brightness distribution, $$H(i) = \sum_{i=1}^{m} pi\log pi$$

where pi is the number of pixels whose brightness falls in the interval i, and the brightness of a pixel is computed as $Y=0.21262 \cdot R+0.71514 \cdot G+0.07215 \cdot B$. The maximum entropy is reached when the number of different brightness values in an interval is uniform across the entire image. Although this definition can be used to measure the amount of information present in the image, it is insensitive to spatial/local pixel correlation. To overcome this problem, Vázquez et al. (see above) propose computing the Shannon entropy of an image at different image resolutions.

Regardless of the metric used to compare the efficacy of the light placement, these optimization techniques start with a set of points around the scene and evaluate the objective function when the light source is placed at one of these points. An iterative process aims to find the optimal light configuration by inserting new points between positions where the objective function is estimated to increase. These optimization techniques are computationally expensive, having to render the scene and evaluate the objective function at each iteration act.

Neural networks (see: Kán, P., Kaufmann, H. DeepLight: light source estimation for augmented reality using deep learning. Vis Comput 35, 873-883 (2019)) have been designed to estimate light sources in augmented reality applications to enhance the visual coherence between virtual and real objects. Synthetic and real-world datasets using measured light sources positions were used to train these networks. Compared to these augmented reality applications, in the field of medical imaging, ground truth is not available for training. That is why these concepts cannot be applied.

Therefore, a deep learning approach is used for determining an optimal light configuration. The light configuration is characterized as optimal if it maximizes the information present in the rendered image.

Deep neural networks require training with hundreds of images to create robust data sets. To this end, images are rendered from different volumes using several camera viewing directions, transfer functions and light configurations and evaluate the rendered images in terms of the amount of information present.

More precisely, RGB images are rendered along with their corresponding surface normal (N), albedo (A) and depth (D) maps for a fixed camera configuration under different lighting configurations. The light directions are restricted to a cone towards the viewpoint and the light intensity is a number between 0 and 1. The rendered images are then evaluated using a metric such as the lighting entropy defined previously.

FIG. 1 shows multiple renderings of raw data, in this case a Dyna CT dataset. Each image is generated using the same camera parameters with the light source illuminating the scene from slightly different directions. The Shannon entropy for each image is used. The image with largest entropy contains more information than the ones with lower score. We use as ground truth:

$$I(\omega_o, l_o)$$

where $\omega_o$ and $l_o$ are the optimal light direction and light intensity for the given configuration.

As can be seen in FIG. 1, the multiple renderings of a Dyna CT dataset, are illuminated from different directions. The Shannon entropy for each image is used. The image in the middle row, last column (highlighted with dotted line) has the highest entropy.

A deep convolutional neural network can then be used to learn the optimal lighting configuration for a new volume, for a fixed camera configuration and transfer function. The network can be trained from medical volume data using an L2 loss on the entropy function:

$$\|H(I(\omega_i, l_i)) - H(I(\omega_o, l_o)\|$$

where $H(I(\omega_o, l_o))$ is the entropy of the ground truth image rendered with lighting direction $\omega_o$ and intensity $l_o$.

An implementation defines the loss function in terms of other perceptual quality image metrics besides entropy. For instance, the amount of image contrast or the Brisque evaluator, that measures image naturalness. For details of the Brisque evaluator it is referred to A. Mittal, A. K. Moorthy and A. C. Bovik, "No-Reference Image Quality Assessment in the Spatial Domain", IEEE Transactions on ImagePro-cessing, 2012.

In another embodiment, the loss function is only evaluated on important regions of the image. Important image regions may preferably be detected by a segmentation algorithm. Higher weight can be given to those important regions. Thus, the method includes a selecting act, which may be executed by a selector, to extract important or relevant image regions. The act of selecting may use a segmentation algorithm.

Deciding the light placement (camera position parameter) remains a manual and time-consuming task. Therefore, a deep learning method finds the optimal light configuration for each rendering task. Compared to the optimization approaches described above (see Gumhold and Vázquez), the present technique can be used when interactive and real-time performance is required.

The training data can be generated by rendering medical volumetric data, varying the lighting, and keeping the rest of parameters fixed. Different metrics such as the lighting entropy can be used to score the best light placement for each case.

In an embodiment, the cinematic renderer in Syngo.via has been used to create clinical images for treatment planning and surgery. The renderer is also used in Cinematic reality to train medical students as well as to improve patient communication. Both solutions would greatly benefit from an automatic light placement, carefully designed to improve the image quality of the rendered images. Presets have been used for years to automatically determine the best transfer function for a particular clinical case and minimize the time spent generating high quality renderings. Similarly, an optimal light configuration for particular cases would save time and help generate better and consistent images for diagnosis, treatment planning, and patient communication.

Figure 2:
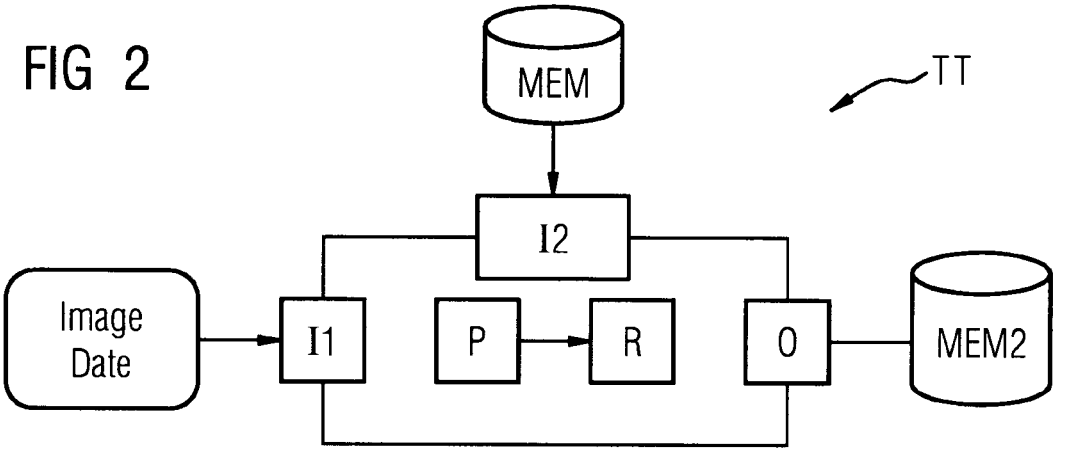
FIG. 2 is a block diagram of one implementation of a training tool for training a CNN.

FIG. 2 shows a block diagram of a training tool TT, which may be implemented in software and/or in hardware. Raw data and in particular medical image data, preferably volume data, are received via the input interface I1. The training tool TT further includes a second interface I2 to a storage MEM, which is adapted for storing a set of rendering configurations, selected from the group consisting of or the group of: a set of different camera parameters, a set of different transfer functions for assigning optical properties, like for example color and opacity, to original values of the raw data to be rendered, and a set of different illumination parameters. The rendering configurations are received by the training tool TT via the second interface I2.

The training tool TT further includes or may access (via network connection) a renderer R, which is configured to render a set of images by using the set of provided rendering configurations.

The training tool TT further includes or may access (via network connection) a processing unit P which is configured for computing an evaluation score for representing an amount of image information for each of the rendered images.

The processing unit P is further configured for using the computed evaluation score for each rendered image and the rendering configurations which have been applied for rendering the image to train the CNN.

The training tool TT further includes an output interface O to a second storage MEM2 for providing the trained CNN.

Figure 3:
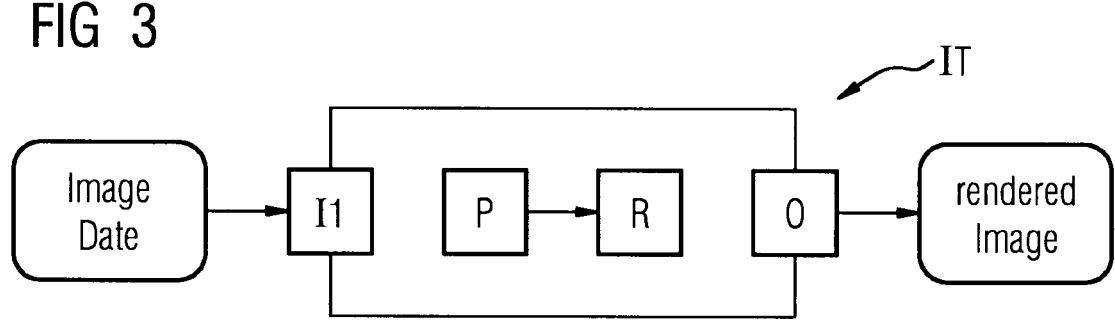
FIG. 3 is a block diagram of an implementation of an illumination tool for determining illumination parameters to be used by a renderer.

FIG. 3 shows an illumination tool $I_T$ for determining the appropriate illumination parameters for rendering image volume data. The illumination tool IT includes an input interface I1 for receiving raw data to be rendered. The illumination tool IT further includes a processing unit P, which is configured for applying the trained CNN for determining the illumination parameters, maximizing an amount of image information present in the rendered image. The illumination tool IT includes or may access a renderer R which is configured for using the determined illumination parameters for rendering the image for the received raw data.

Figure 4:
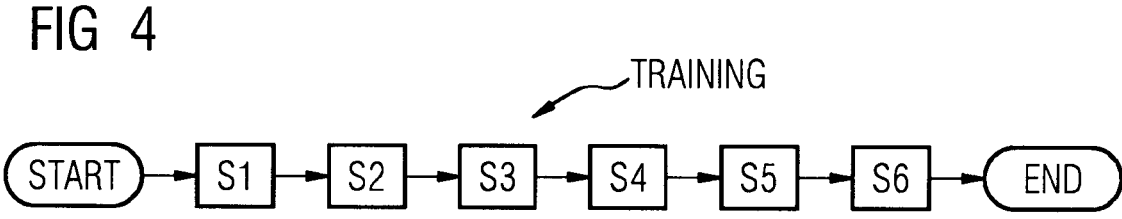
FIG. 4 is a flow chart of a training method according to an embodiment.

FIG. 4 is a flow chart showing a training method according to a preferred embodiment. In act S2, raw data for rendering are received. In act S2, a set of rendering configurations are provided or determined from a presetting, selected from the group consisting of or group of: a set of different camera parameters, a set of different transfer functions for assigning optical properties, like for example color and opacity, to original values of the raw data to be rendered, and a set of different illumination parameters. A renderer R is used or applied in act S3 to render a set of images by using the set of provided rendering configurations. In act S4, an evaluation score for representing an amount of image information for each of the rendered images is computed. In act S5, the CNN is trained by using the computed evaluation score for each rendered image and the rendering configurations that have been applied for rendering the image. After this, the trained CNN may be provided as result in act S6.

After this, the method may end or may be re-iterated.

Figure 5:
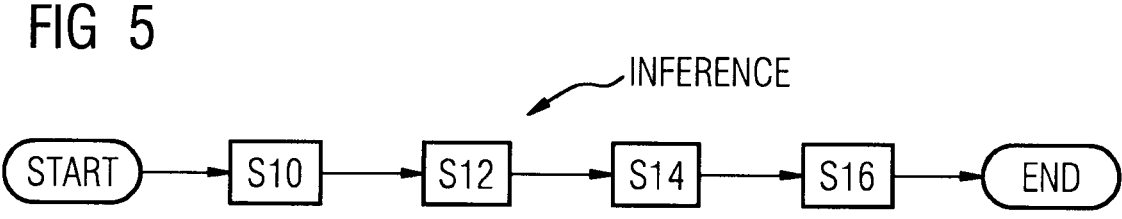
FIG. 5 is a flow chart of one embodiment of a method for the inference phase using a trained CNN.

FIG. 5 shows a flow chart of the inference phase when the trained CNN is used for determination of illumination parameters for the purpose of rendering. After start of the method, in act S10, raw data for rendering are received. In act S12, the trained CNN is applied for determining those illumination parameters in act S14 that maximize an amount of image information present in the rendered image. These determined illumination parameters are used in act S16 for rendering the image for the received raw data.

Wherever not already described explicitly, individual embodiments, or their individual aspects and features, described in relation to the drawings can be combined or exchanged with one another without limiting or widening the scope of the described invention, whenever such a combination or exchange is meaningful and in the sense of this invention. Advantages which are described with respect to a particular embodiment of present invention or with respect to a particular figure are, wherever applicable, also advantages of other embodiments of the present invention.

The invention claimed is:

1. A method for training a convolution neural network (CNN) for determining illumination parameters for image rendering of medical data, the method comprising:
   receiving raw data for rendering;
   providing a set of three-dimensional-to-two-dimensional rendering configurations, selected from the group of:
   a set of different camera parameters, a set of different transfer functions for assigning optical properties to original values of the raw data to be rendered, and a set of different illumination parameters;
   rendering by a renderer a set of images using the set of provided rendering configurations;

computing an evaluation score for representing an amount of image information for each of the rendered images independent of other rendered images;
   training the CNN using the computed evaluation score for each rendered image and the rendering configurations which have been applied for rendering each image, the training using losses as differences between the evaluations scores, wherein the training is executed by using an L2 loss as the loss on an entropy function as the evaluation score where $\|H(I(\omega_i,l_i))-H(I(\omega_o,l_o))\|$, where $H(I(\omega_i,l_i))$ is an entropy of a respective rendered image rendered with lighting direction $\omega_i$ and intensity $l_i$ and where $H(I(\omega_o,l_o))$ is an entropy of a ground truth image rendered with lighting direction $\omega_o$ and intensity $l_o$; and
   storing the CNN as trained from the training.

2. The method according to claim 1, wherein the raw data is a volumetric medical dataset to be rendered.

3. The method according to claim 1, wherein the evaluation score is a Shannon Entropy, an extended Shannon Entropy, another image entropy, or a measure of image information content.

4. The method according to claim 1, wherein the evaluation score is calculated as an amount of image contrast or as a Brisque evaluator that measures image naturalness.

5. The method according to claim 1, wherein training the CNN is executed by generating values for adjusting biases and weights of the CNN.

6. The method according to claim 1, wherein the camera parameters comprise a position parameter representing a position of the camera and/or a direction parameter representing a direction of emitted rays of the camera.

7. The method according to claim 1, wherein the camera parameters comprise a camera aperture parameter.

8. The method according to claim 1, wherein rendering comprises cinematic rendering and/or path tracing rendering.

9. The method according to claim 1, wherein the illumination parameters comprise a direction parameter in case of directional lightning or a position parameter in case of a point light source.

10. The method according to claim 1, wherein the illumination parameters comprise an intensity parameter.

11. A method for determining illumination parameters for image rendering of medical data, the method comprising:
   receiving raw data for rendering, the raw data comprising the medical data;
   determining the illumination parameters with a trained convolutional neural network (CNN) configured by training to maximize an amount of image information present in a rendered image, the configuration by training having used a loss that was a difference between the amounts of imaging information in output and ground truth images, the loss having comprised an L2 loss as the loss on an entropy function as an evaluation score where $\|H(I(\omega_i,l_i))-H(I(\omega_o,l_o))\|$, where $H(I(\omega_i,l_i))$ is an entropy of a respective rendered image rendered with lighting direction $\omega_i$ and intensity $l_i$ and where $H(I(\omega_o,l_o))$ was an entropy of a ground truth image rendered with lighting direction $\omega_o$ and intensity $l_o$; and
   rendering the rendered image using the determined illumination parameters.

12. The method according to claim 11, wherein the CNN was trained with the entropy function comprising a Shannon Entropy, an extended Shannon Entropy, or another image entropy.

13. The method according to claim 11, wherein rendering comprises cinematic rendering and/or path tracing rendering.

14. The method according to claim 11, wherein the illumination parameters comprise a direction parameter in case of directional lightning or a position parameter in case of a point light source.

15. The method according to claim 11, wherein the illumination parameters comprise an intensity parameter.

16. A medical imaging system for determining illumination parameters for image rendering of medical data, the medical imaging system comprising:

an input interface for receiving raw data to be rendered;

a processor configured for applying a trained convolutional neural network (CNN) for determining the illumination parameters, the CNN configured by training, with a loss as a difference in amounts of information between output and ground truth images, to maximize an amount of image information present in the rendered image, the loss having comprised an L2 loss as the loss on an entropy function as an evaluation score where $\|H(I(\omega_i,l_i))-H(I(\omega_o,l_o)\|$, where $H(I(\omega_i,l_i))$ is an entropy of a respective rendered image rendered with lighting direction $\omega_i$ and intensity $l_i$ and where $H(I(\omega_o,l_o))$ was an entropy of a ground truth image rendered with lighting direction $\omega_o$ and intensity $l_o$; and a renderer configured to render a medical image using the determined illumination parameters from the raw data.

17. The medical imaging system of claim 16, wherein the rendering is configured for cinematic rendering and/or path tracing rendering.

18. The medical imaging system of claim 16, wherein the illumination parameters comprise (a) an intensity parameter and (b) a direction parameter in case of directional lightning or a position parameter in case of a point light source.

* * * * *